(12) United States Patent
Shen et al.

(10) Patent No.: US 10,863,498 B2
(45) Date of Patent: Dec. 8, 2020

(54) SEPARATE CONFIGURATION OF NUMEROLOGY-ASSOCIATED RESOURCES

(71) Applicant: Guangdong OPPO Mobile Telecommunications Corp., Ltd., Guangdong (CN)

(72) Inventors: Jia Shen, Guangdong (CN); Hua Xu, Ottawa (CA)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/515,669

(22) Filed: Jul. 18, 2019

(65) Prior Publication Data

US 2019/0342870 A1  Nov. 7, 2019

Related U.S. Application Data

(63) Continuation of application No. PCT/CN2018/072573, filed on Jan. 15, 2018.

(60) Provisional application No. 62/448,676, filed on Jan. 20, 2017.

(51) Int. Cl.
| | |
|---|---|
| *H04J 3/16* | (2006.01) |
| *H04W 72/04* | (2009.01) |
| *H04W 76/27* | (2018.01) |
| *H04L 1/16* | (2006.01) |
| *H04L 5/00* | (2006.01) |
| *H04L 27/26* | (2006.01) |
| *H04W 72/12* | (2009.01) |

(52) U.S. Cl.
CPC ......... *H04W 72/042* (2013.01); *H04L 1/1642* (2013.01); *H04L 5/0094* (2013.01); *H04L 27/2607* (2013.01); *H04W 72/0453* (2013.01); *H04W 72/1273* (2013.01); *H04W 76/27* (2018.02)

(58) Field of Classification Search
CPC ....... H04L 5/005; H04L 5/0023; H04L 27/26; H04L 1/1642; H04L 5/0048; H04W 72/082; H04W 72/04; H04W 72/042; H04W 72/0453; H04W 72/12; H04W 5/0048; H04W 72/0413
See application file for complete search history.

(56) References Cited

U.S. PATENT DOCUMENTS 10,433,283 B2 * 10/2019 Islam .................... H04L 5/0064
2016/0192333 A1   6/2016 Wang et al.
(Continued)

FOREIGN PATENT DOCUMENTS

| WO | 2015098880 A1 | 7/2015 |
| WO | 2016040290 A1 | 3/2016 |

OTHER PUBLICATIONS

3GPP TSG RAN WG1 NR AdHoc R1-1700570 Spokane, USA, Jan. 16-20, 2017.

(Continued)

*Primary Examiner* — Hanh N Nguyen

(57) ABSTRACT

A method and apparatus for separately configuring sets of frequency resources for a PDCCH and another physical channel are disclosed. According to the method, the first and second messages are configured separately to respectively indicate the sets of frequency resources with associated numerologies for the PDCCH and other physical channels.

10 Claims, 11 Drawing Sheets

(56) References Cited

U.S. PATENT DOCUMENTS

2017/0201968 A1* 7/2017 Nam ................ H04W 4/70
2018/0241524 A1* 8/2018 Andersson ............ H04L 1/1887

OTHER PUBLICATIONS

3GPP TSG RAN WG1 Meeting #86bis R1-1608900 Lisbon, Portugal, Oct. 10-14, 2016.
TSG-RAN WG1 #87 R1-1612908 Reno, NV, USA, Nov. 14-18, 2016.
Extended Search Report for EP Application No. 18741302.6 dated Dec. 13, 2019.
3GPP TSG-RAN WG1 #87; R2-1612312; Reno, USA, Nov. 14-18, 2016.
3GPP TSG-RAN WG1 #NR; R2-1701148; Spokane, USA, Jan. 16-20, 2017.
3GPP TSG-RAN WG1 NR Ad-Hoc #2; R1-1710165; Qingdao, P.R. China, Jun. 27-30, 2017.
Canada First Office Action for Canada Application 3,051,021 dated Sep. 10, 2020.
English translation of First Office Action for Chile Application 201902000 dated Jul. 20, 2020.
English translation of First Office Action for TW Application 107101980.
3GPP TSG-RAN WG1 #87 R1-1613023; Reno, NV, USA, Nov. 14-18, 2016.
Written Opinion for SG Application 11201906647T dated Jul. 15, 2020.

* cited by examiner

SEPARATE CONFIGURATION OF NUMEROLOGY-ASSOCIATED RESOURCES

CROSS-REFERENCE TO RELATED APPLICATION(S)

This application is a continuation application of International Application No. PCT/CN2018/072573, filed on Jan. 15, 2018, which claims priority to U.S. Provisional Application No. 62/448,676, filed on Jan. 20, 2017, the entire contents of both of which are incorporated herein by reference.

TECHNICAL FIELD

The disclosure generally relates to resource configuration in the field of communications, and more particularly, to a method and apparatus for separately configuring sets of frequency resources for a Physical Downlink Control Channel (PDCCH) and another physical channel.

BACKGROUND

In Long Term Evolution (LTE) of the 4th-Generation (4G) communication, physical channels, such as both a PDCCH and a PDSCH, are transmitted over whole system bandwidth and use a single numerology. For example, in the whole system bandwidth, both the PDCCH and the PDSCH use the same subcarrier spacing (SCS), such as, 15 kHz.

Along with the proposal and research of the 5th-Generation (5G) communication technology, a system bandwidth of a carrier can be partitioned into multiple resource sets (or called Bandwidth Parts (BWPs), or subbands). Each of the BWPs is associated with a specific numerology. Thus, it is a problem how to configure the resource sets for the physical channels.

In a related technology, there is an approach for configuring subbands with associated numerologies for the PDCCH and the PDSCH. According to this approach, the subbands with associated numerologies are indicated for the PDCCH(s) and the PDSCH(s) at the same time only via a system message, such as, System Information (SI), a Radio Resource control (RRC) signaling or a broadcasting signaling. For example, FIG. 1 and FIG. 2 show a schematic configuration in a variable-bandwidth subband scenario and in an identical-bandwidth subband scenario, respectively. In these two scenarios, the SCS is taken for an example of associated numerologies. As shown in FIG. 1, subband 1 with SCS 1, subband 2 with SCS 2 and subband 3 with SCS 3 are respectively indicated at the same time for PDCCH A and PDSCH A, PDCCH B and PDSCH B, as well as PDCCH C and PDSCH C, in only one message. Further as shown in FIG. 2, subband 2 with SCS 1 is indicated for both PDCCH A and PDSCH A via SI, a RRC signaling or a broadcasting signaling.

This approach can only configure a unified set of subbands/BWPs with associated numerologies for respective PDCCHs and PDSCHs all at once, and thus cannot fully and flexibly utilize the advantages about multiple resource sets with multi-numerology in the 5G technology.

SUMMARY

The implementations of the disclosure provide a configuration solution for separately configuring sets of frequency resources for a Physical Downlink Control Channel (PDCCH) and another physical channel.

In a first aspect of the disclosure, a method for configuring sets of frequency resources for a Physical Downlink Control Channel (PDCCH) and another physical channel is provided. According to the method, a first message and a second message are configured. The first message is configured to indicate a first set of frequency resources with a first associated numerology for the PDCCH, and the second message is configured to indicate a second set of frequency resources with a second associated numerology for the another physical channel. The first message and the second message are transmitted. The PDCCH is transmitted in a resource from the first set of frequency resources and the another physical channel is transmitted in a resource from the second set of frequency resources.

In a second aspect of the disclosure, a method for determining sets of frequency resources for a Physical Downlink Control Channel (PDCCH) and another physical channel is provided. According to the method, the PDCCH is received, the PDCCH being transmitted in a resource from a first set of frequency resources with a first associated numerology. The first set of frequency resources with the first associated numerology is indicated by a first message for the PDCCH. The another physical channel is received, the another physical channel being transmitted in a resource from a second set of frequency resources with a second associated numerology. The second set of frequency resources with the second associated numerology is indicated by a second message for the another physical channel. Sets of frequency resources for the PDCCH and the another physical channel are determined according to the first and second messages.

In a third aspect of the disclosure, an apparatus for separately configuring sets of frequency resources for a Physical Downlink Control Channel (PDCCH) and another physical channel is provided, which includes a configuration module and a transmission module. The configuration module configures a first message and a second message. The first message is configured to indicate a first set of frequency resources with a first associated numerology for the PDCCH, and the second message is configured to indicate a second set of frequency resources with a second associated numerology for the another physical channel. The transmission module transmits the first message and the second message, transmits the PDCCH in a resource from the first set of frequency resources and transmits the another physical channel in a resource from the second set of frequency resources.

In an example, the first and second sets of frequency resources are a bandwidth part (BWP) or a control resource set (CORESET) in a BWP.

In an example, at least one portion of the first set of frequency resources may not overlap with the second set of frequency resources. A value of the first associated numerology may be different from a value of the second associated numerology.

In an example, the first message is one of SI, a RRC signaling, and a broadcasting signaling and the second message is Downlink Control Information (DCI) transmitted in the PDCCH or a following PDCCH.

In an example, the first message may include a common message and a UE-specific message, the common massage being configured to indicate a common control resource set with an associated numerology for a first PDCCH and the UE-specific message being configured to indicate a UE-specific control resource set with an associated numerology for a second PDCCH. The second message may be DCI transmitted in the first or second PDCCH.

In an example, the first message may come from a previous PDCCH.

In an example, the first associated numerology for the PDCCH is the same as that for the previous PDCCH.

In an example, each of the first and second messages may be one of SI, a RRC signaling, and a broadcasting signaling.

In an example, the another physical channel may be at least one of a Physical Downlink Sharing Channel (PDSCH), a Physical Uplink Control Channel (PUCCH) and a Physical Uplink Sharing Channel PUSCH.

In an example, each of the first and second associated numerologies may be at least one of a Subcarrier Spacing (SCS) and a cyclic prefix (CP).

In an example, the PDCCH may contain scheduling information of the another physical channel.

In a fourth aspect of the disclosure, an apparatus for determining sets of frequency resources for a Physical Downlink Control Channel (PDCCH) and another physical channel is provided, which includes a receiving module and a determination module. The receiving module is configured to receive the PDCCH and the another physical channel. The PDCCH is transmitted in a resource from a first set of frequency resources with a first associated numerology. The first set of frequency resources with the first associated numerology is indicated by a first message for the PDCCH. The another physical channel is transmitted in a resource from a second set of frequency resources with a second associated numerology. The second set of frequency resources with the second associated numerology is indicated by a second message for the another physical channel. The determination module is configured to determine sets of frequency resources for the PDCCH and the another physical channel according to the first and second messages.

In an example, the first and second sets of frequency resources are a bandwidth part (BWP) or a control resource set (CORESET) in a BWP.

In an example, at least one portion of the first set of frequency resources may not overlap with the second set of frequency resources. A value of the first associated numerology may be different from a value of the second associated numerology.

In an example, the first message may be one of SI, a RRC signaling, and a broadcasting signaling and the second message is Downlink Control Information (DCI) transmitted in the PDCCH or a following PDCCH.

In an example, the first message may include a common message and a UE-specific message, the common massage being configured to indicate a common control resource set with an associated numerology for a first PDCCH and the UE-specific message being configured to indicate a UE-specific control resource set with an associated numerology for a second PDCCH. The second message may be DCI transmitted in the first or second PDCCH.

In an example, the first message may come from a previous PDCCH.

In an example, the first associated numerology for the PDCCH is the same as that for the previous PDCCH.

In an example, each of the first and second messages may be one of SI, a RRC signaling, and a broadcasting signaling.

In an example, the another physical channel may be at least one of a Physical Downlink Sharing Channel (PDSCH), a Physical Uplink Control Channel (PUCCH) and a Physical Uplink Sharing Channel PUSCH.

In an example, each of the first and second associated numerologies may be at least one of a Subcarrier Spacing (SCS) and a cyclic prefix (CP).

In an example, the PDCCH may contain scheduling information of another physical channel.

It should be understood that the above general description and detailed description below are only exemplary and explanatory and not intended to limit the disclosure.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Reference will now be made in detail to exemplary implementations, examples of which are illustrated in the accompanying drawings. The implementations set forth in the following description of exemplary implementations do not represent all implementations consistent with the disclosure. Instead, they are merely examples of apparatuses and methods consistent with aspects related to the disclosure.

The basic idea of the disclosure is to separately configure the sets of frequency resources with corresponding numerologies for a PDCCH and other physical channels via separate signalings/messages. Thus, in one time scheduling unit (e.g. a slot, a mini-slot, a subframe), the PDCCH and other physical channels can have different subband partitioning and different numerology configurations.

Figure 1:
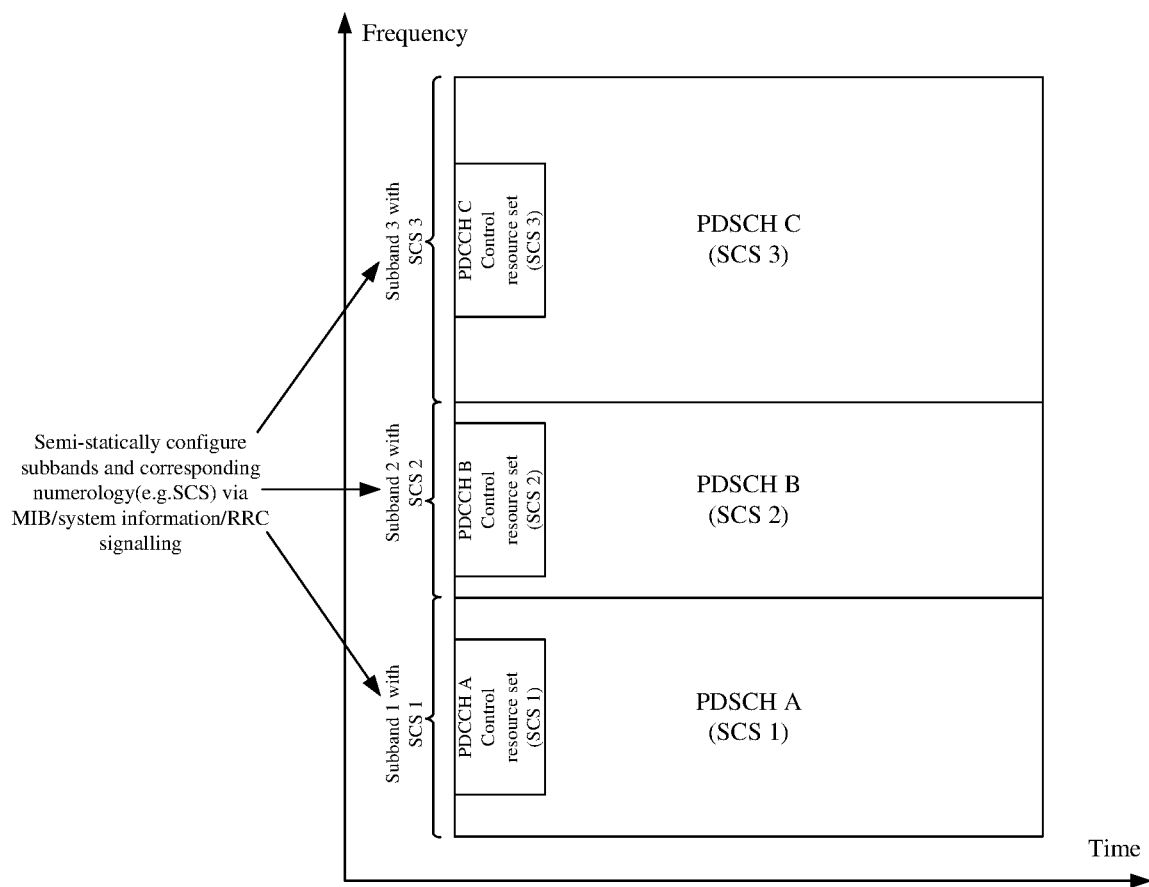
FIG. 1 is a schematic diagram showing configuration in a variable-bandwidth subband scenario according to the related technology.
Figure 2:
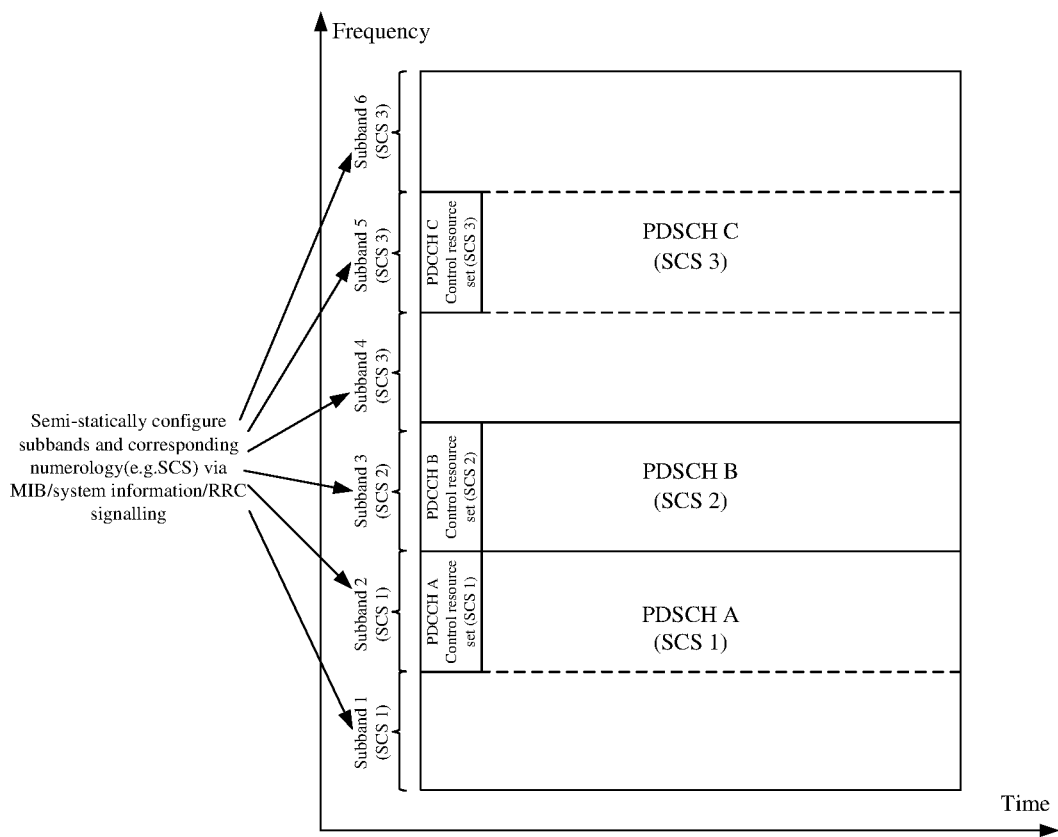
FIG. 2 is a schematic diagram showing configuration in an identical-bandwidth subband scenario according to the related technology.
Figure 3:
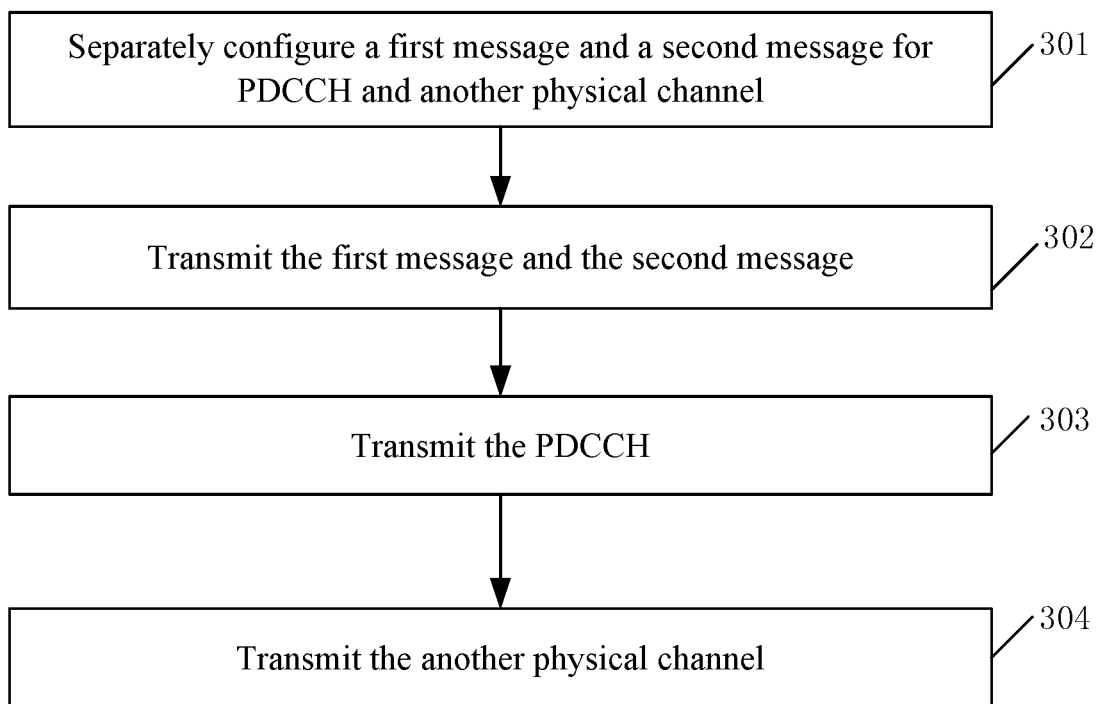
FIG. 3 is a flow chart showing a method for separately configuring sets of frequency resources for a PDCCH and another physical channel according to an implementation of the disclosure.

FIG. 3 is a flow chart showing a method for separately configuring sets of frequency resources for a PDCCH and another physical channel according to an implementation of the disclosure. This method may be applied at a base station (called gNB in 5G) side or a system side. Referring to FIG. 3, the method includes the following steps.

In step 301, a first message and a second message are configured separately. The first message is configured to indicate a first set of frequency resources with a first associated numerology for the PDCCH. The second message is configured to indicate a second set of frequency resources with a second associated numerology for the another physical channel.

In step 302, the first message and the second message are transmitted.

In step 303, the PDCCH is transmitted in a resource from the first set of frequency resources.

In step 304, the another physical channel is transmitted in a resource from the second set of frequency resources.

Herein, the first and second sets of frequency resources are a bandwidth part (BWP) or a subband or a control resource set (CORESET) in a BWP/subband. For example, the first set of frequency resources for the PDCCH is a control resource set (CORESET) in a subband and the second set of frequency resources for other physical channels is the subband. Referring to the implementation shown in FIG. 4, the sizes and positions of the control resource sets and their numerologies (taking SCS as an example) of the PDCCHs are indicated by Message 1, whereas the sizes and positions of the subbands and their numerologies (also taking SCS as an example) of the PDSCHs are configured by Message 2. Specifically, a control resource set with SCS 2 in subband 2 is indicated by Message 1 for the PDCCH B and the subband 2 with SCS 2 is indicated by Message 2 for the PDSCH B. Herein, Message 1 is the first message and may be SI or a broadcasting signaling or a RRC signaling. Message 2 is the second message and may be DCI transmitted in the PDCCH.

In an exemplary example, at least one portion of the first set of frequency resources may not overlap with the second set of frequency resources. Similarly, a value of the first associated numerology may be different from a value of the second associated numerology.

Referring to the implementation shown in FIG. 4 again, a portion of the control resource set with SCS 1 for PDCCH A occupies the subband 1 with SCS 1 for PDSCH A and the other portion of the control resource set with SCS 1 for PDCCH A occupies the subband 2 with SCS 2 for the PDSCH B. In other words, within subband 2 with SCS 2 for PDSCH B, some resource can be configured to the control resource set with SCS 1 for PDCCH A. The first set of frequency resources for the PDCCH is not exactly within the second set of frequency resources for the PDSCH corresponding to the PDCCH. As such, the PDCCH and the PDSCH can have different subband partitioning and corresponding numerology configurations. Therefore, bandwidth resources are effectively utilized and full flexibility of resource configuration is provided.

Figure 4:
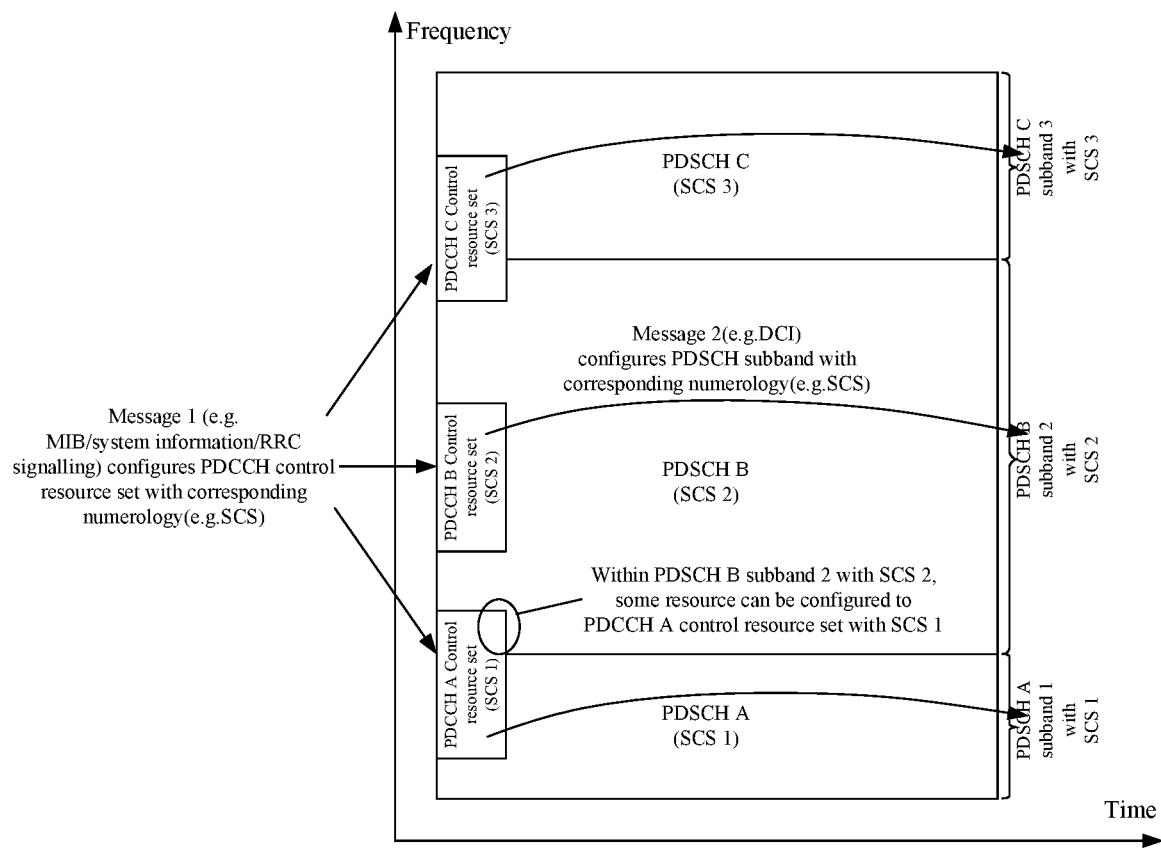
FIG. 4 is a schematic diagram showing configuration in a variable-bandwidth subband scenario according to an implementation of the disclosure.
Figure 5:
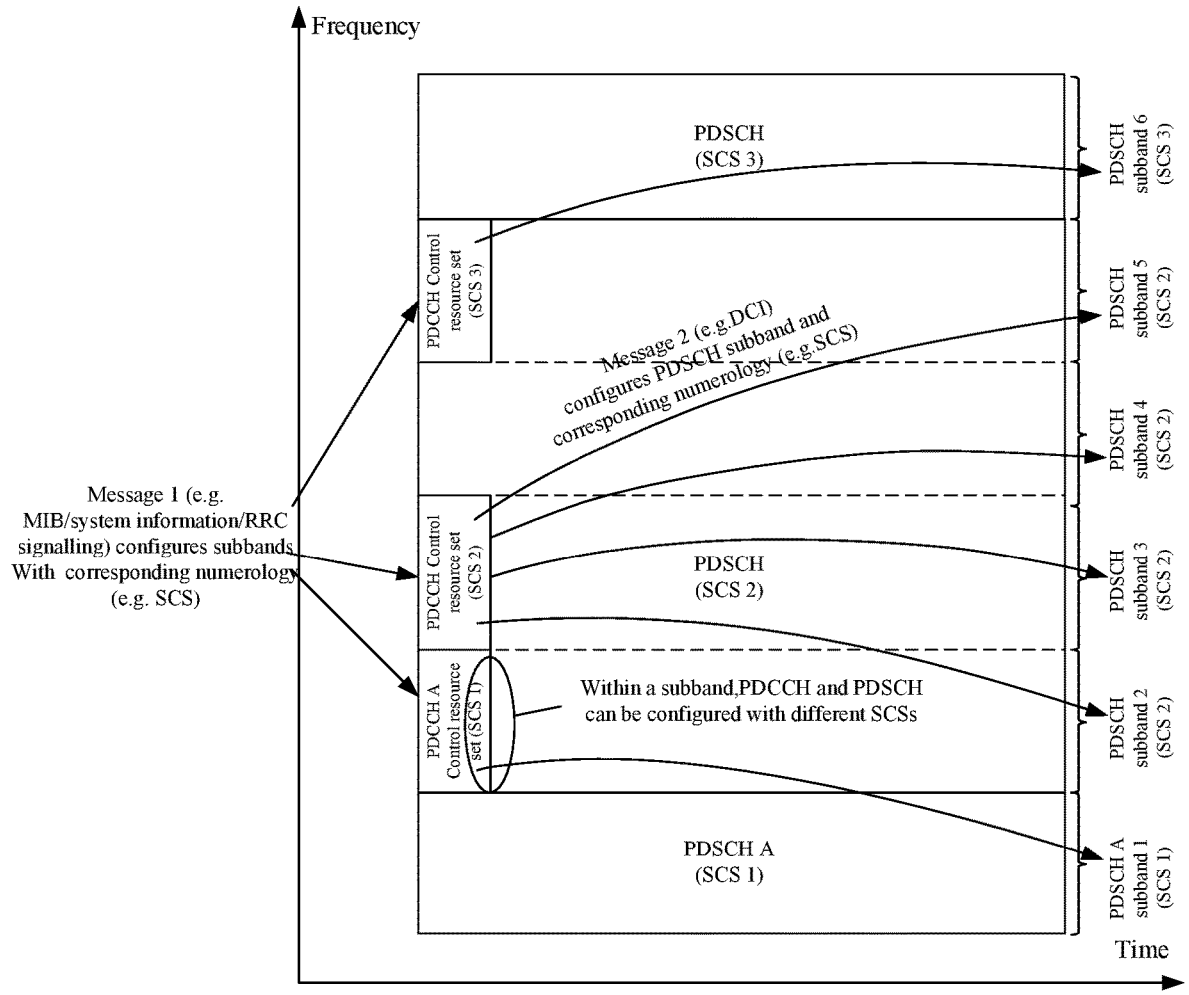
FIG. 5 is a schematic diagram showing configuration in an identical-bandwidth subband scenario according to an implementation of the disclosure.

Referring to the implementation shown in FIG. 5, this implementation is similar as that shown in FIG. 4. The difference is that subbands are partitioned with identical-sizes in this implementation. Different amount of resources can be configured to different numerologies by allocating different number of subbands. For example, in FIG. 5, four subbands with the identical bandwidth, i.e., subband 2-subband 5, are indicated for PDSCH B. Within subband 2, the PDCCH is configured with SCS 1 and the PDSCH is configured with SCS 2. The value of the first associated numerology is different from that of the second associated numerology. The values of the numerologies for the PDCCH and the PDSCH may be different.

Figure 6:
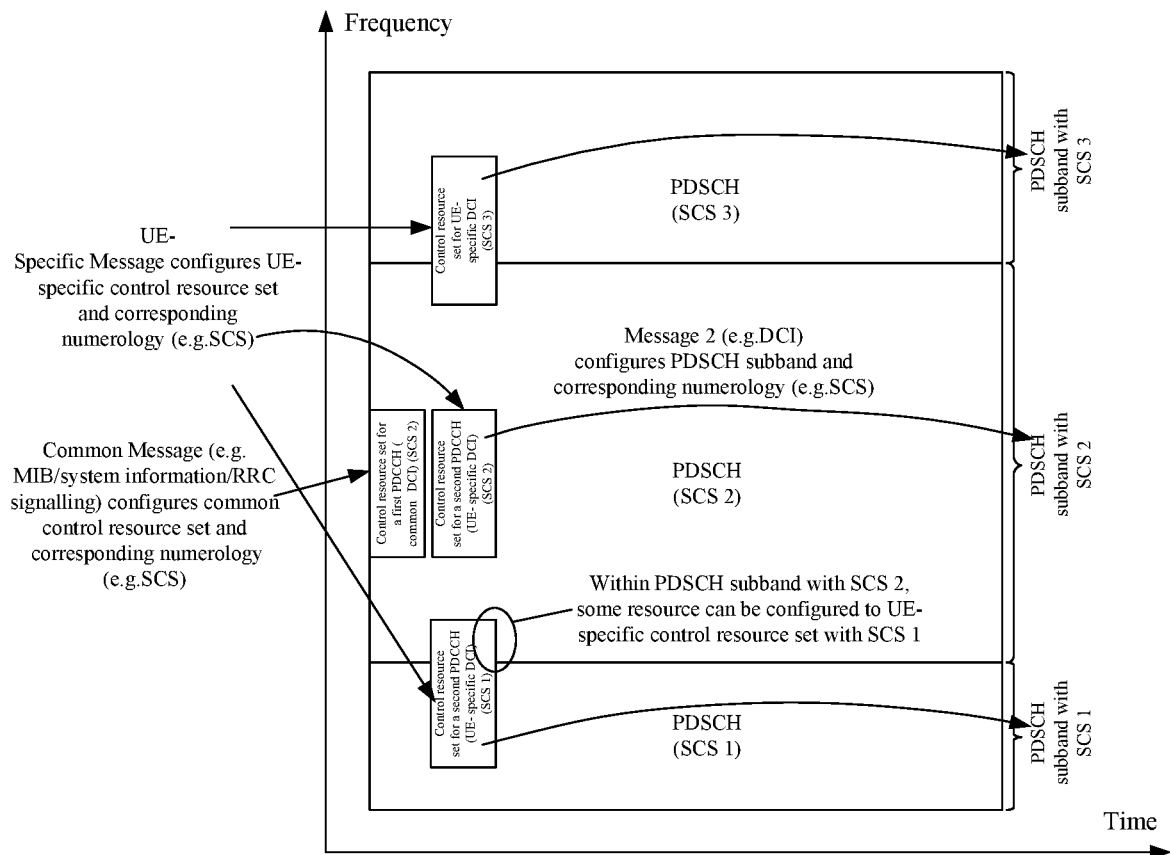
FIG. 6 is a schematic diagram showing configuration in a variable-bandwidth subband scenario according to another implementation of the disclosure.
Figure 7:
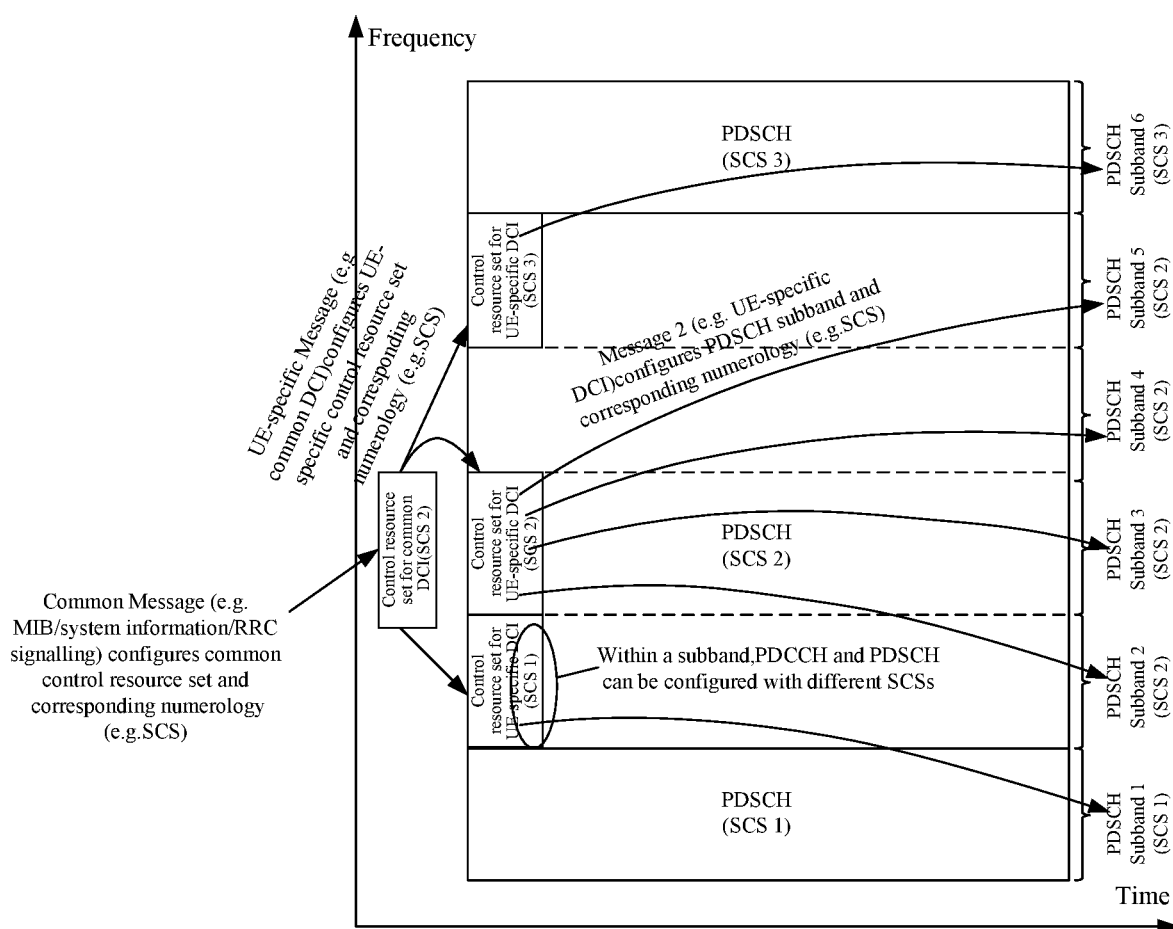
FIG. 7 is a schematic diagram showing configuration in an identical-bandwidth subband scenario according to another implementation of the disclosure.

In an exemplary example, the first message includes a common message and a UE-specific message. The common massage is configured to indicate a common control resource set with an associated numerology for a first PDCCH and the UE-specific message is configured to indicate a UE-specific control resource set with an associated numerology for a second PDCCH. The second message is DCI transmitted in the first or second PDCCH. Referring to the implementation shown in FIG. 6, Common Message, such as SI, a broadcasting signaling or a RRC signaling, indicates a common control resource set with SCS 2 for a first PDCCH, in particular, common DCI of the first PDCCH. UE-Specific Message indicates a UE-specific control resource set with SCS 1 for a second PDCCH, in particular, UE-specific DCI of the second PDCCH. Herein, UE-specific Message may be SI, a broadcasting signaling or a RRC signaling, as shown in FIG. 6. As another example, UE-specific Message may be a common DCI indicated by the Common Message, as shown in FIG. 7. Similarly, the second message may be the common DCI indicated by the Common Message or UE-specific DCI indicated by the UE-Specific Message. In other words, the second message may be DCI transmitted in the first PDCCH or also may be DCI transmitted in the second PDCCH.

In an exemplary example, the first message may be any one of SI, a RRC signaling, or a broadcasting signaling and the second message is Downlink Control Information (DCI) transmitted in the PDCCH or a following PDCCH.

Figure 8:
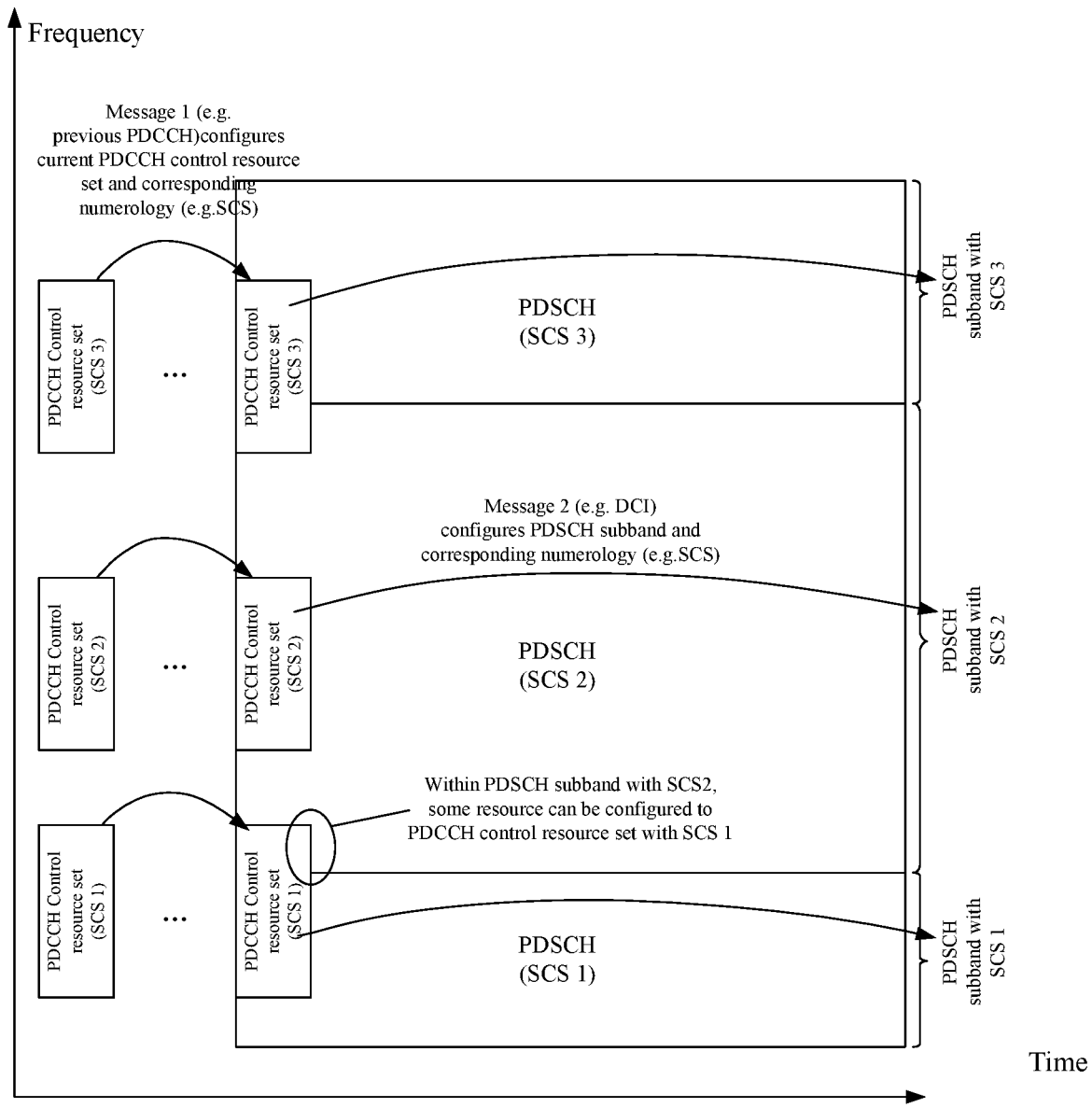
FIG. 8 is a schematic diagram showing configuration in a variable-bandwidth subband scenario according to still another implementation of the disclosure.

In an exemplary example, the first message comes from a previous PDCCH. In this case, the first associated numerology for the PDCCH may be the same as that for the previous PDCCH. Referring to the implementation shown in FIG. 8, Message 1 for the PDCCH C comes from a previous PDCCH C' with the same SCS. In this case, the SCS of the current resource set of PDCCH C can be implicitly derived from that of the previous PDCCH C' and the SCS is not required to be explicitly indicated by the previous PDCCH C'. Message 2 for the PDSCH C is DCI transmitted in the current PDCCH C. Similarly, the SCS for the PDSCH subband can be implicitly derived from that of the DCI, and is not required to be explicitly indicated by the DCI.

Figure 9:
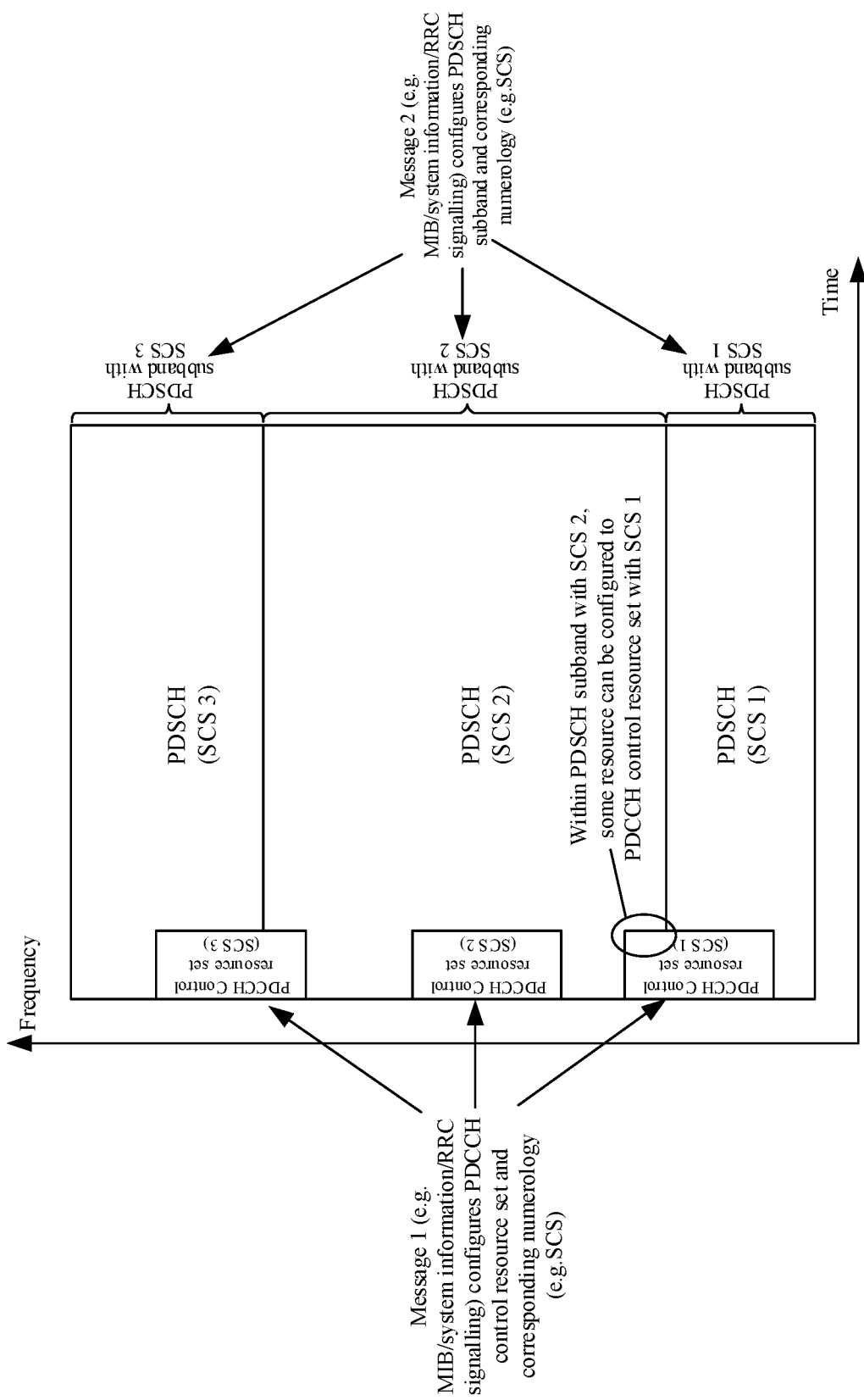
FIG. 9 is a schematic diagram showing configuration in a variable-bandwidth subband scenario according to yet another implementation of the disclosure.

In an exemplary example, each of the first and second messages is one of SI, a RRC signaling, and a broadcasting signaling. Referring to the implementation shown in FIG. 9, Message 2, just like Message 1, may be also one of SI, a RRC signaling, and a broadcasting signaling.

As shown above, since the resources for the PDCCH and the PDSCH are separately configured via separate Messages 1 and 2, overlapping resource between the resource set for PDCCH and a subband for PDSCH is possible. As shown with the circle in FIG. 4, within a subband with SCS2 configured to PDSCH B, some resource can also be configured to control resource set with SCS1 for PDCCH A. In this case, the gNB scheduler can avoid resource allocation conflict by not scheduling the overlapping resource to the PDSCH B. For example, resource in first several symbols of subband 2 with SCS 2 is reserved for PDCCH A. That is, resource these first several symbols are not scheduled in transmitting PDSCH B. Further, the PDCCH may include the scheduling information of these other physical channels.

It is noted that the above implementations of the disclosure take the PDSCH as an example of the another physical channel. Definitely, other physical channels, such as, a Physical Uplink Control Channel (PUCCH) and a Physical Uplink Sharing Channel (PUSCH) are applicable.

It is noted that the above implementations of the disclosure take the SCS as an example of the numerologies. Other numerologies, such as a cyclic prefix (CP) or the like, are also applicable. In addition, both the single numerology and multi-numerology are also applicable for the above implementations.

Figure 10:
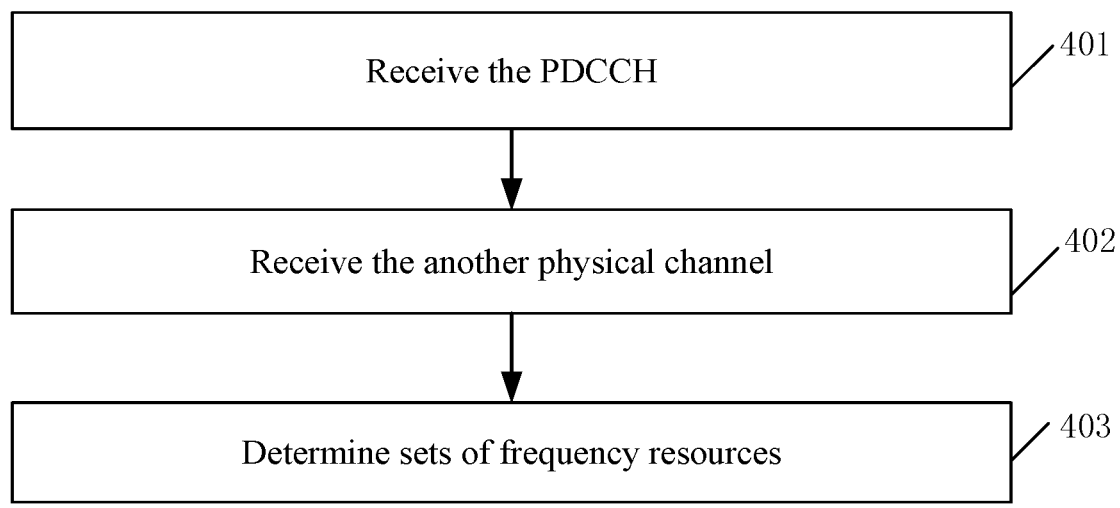
FIG. 10 is a flow chart showing a method for determining sets of frequency resources for a PDCCH and another physical channel according to an implementation of the disclosure.

Correspondingly, at the side of a UE, a method for determining sets of frequency resources for the PDCCH and another physical channel may be applied. FIG. 10 is a flow chart showing a method for determining sets of frequency resources for a PDCCH and another physical channel according to an implementation of the disclosure. Referring to FIG. 10, the method includes the following steps.

In step 401, the PDCCH is received. The PDCCH is transmitted in a resource from a first set of frequency resources with a first associated numerology. The first set of frequency resources with the first associated numerology is indicated by a first message for the PDCCH.

In step 402, the another physical channel is received. The another physical channel is transmitted in a resource from a second set of frequency resources with a second associated numerology. The second set of frequency resources with the second associated numerology is indicated by a second message for the another physical channel.

In step 403, sets of frequency resources for the PDCCH and the another physical channel are determined according to the first and second messages.

In an example, the first and second sets of frequency resources are a bandwidth part (BWP) or a control resource set (CORESET) in a BWP.

In an example, at least one portion of the first set of frequency resources does not overlap with the second set of frequency resources. A value of the first associated numerology is different from a value of the second associated numerology.

In an example, the first message is one of SI, a RRC signaling, or a broadcasting signaling and the second message is Downlink Control Information (DCI) transmitted in the PDCCH or a following PDCCH.

In an example, the first message includes a common message and a UE-specific message, the common massage being configured to indicate a common control resource set with an associated numerology for a first PDCCH and the UE-specific message being configured to indicate a UE-specific control resource set with an associated numerology for a second PDCCH. The second message is DCI transmitted in the first or second PDCCH.

In an example, the first message comes from a previous PDCCH.

In an example, the first associated numerology for the PDCCH is the same as that for the previous PDCCH.

In an example, each of the first and second messages is one of SI, a RRC signaling, and a broadcasting signaling.

In an example, the another physical channel is at least one of a Physical Downlink Sharing Channel (PDSCH), a Physical Uplink Control Channel (PUCCH) and a Physical Uplink Sharing Channel (PUSCH).

In an example, each of the first and second associated numerologies is at least one of a Subcarrier Spacing (SCS) and a cyclic prefix (CP).

Figure 11:
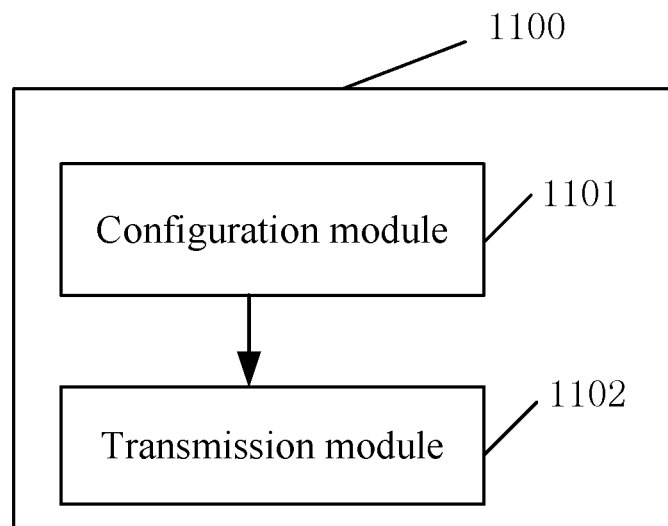
FIG. 11 is a schematic diagram illustrating an apparatus for separately configuring sets of frequency resources for a PDCCH and another physical channel according to an implementation of the disclosure.

FIG. 11 illustrates an apparatus for separately configuring sets of frequency resources for a PDCCH and another physical channel according to an implementation of the disclosure. Referring to FIG. 11, the apparatus 1100 includes a configuration module 1101 and a transmission module 1102.

The configuration module 1101 is to configure a first message and a second message. The first message is configured to indicate a first set of frequency resources with a first associated numerology for the PDCCH, and the second message is configured to indicate a second set of frequency resources with a second associated numerology for the another physical channel.

The transmission module 1102 is configured to transmit the first message and the second message, transmit the PDCCH in a resource from the first set of frequency resources and transmit the another physical channel in a resource from the second set of frequency resources.

The detailed description about the first and second messages and specific implementation of the apparatus may refer to the method implementations described in combination with FIG. 3-FIG. 9, which is not described herein again.

Figure 12:
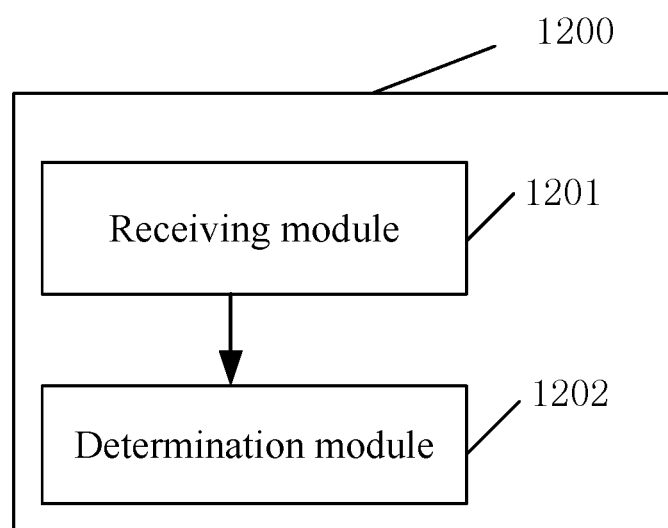
FIG. 12 is a schematic diagram illustrating an apparatus for determining sets of frequency resources for a PDCCH and another physical channel according to an implementation of the disclosure.

FIG. 12 illustrates an apparatus for determining sets of frequency resources for a PDCCH and another physical channel according to an implementation of the disclosure. Referring to FIG. 12, the apparatus 1200 includes a receiving module 1201 and a determination module 1202.

The receiving module 1201 is configured to receive the PDCCH and the another physical channel. The PDCCH is transmitted in a resource from a first set of frequency resources with a first associated numerology. The first set of frequency resources with the first associated numerology is indicated by a first message for the PDCCH. The another physical channel is transmitted in a resource from a second set of frequency resources with a second associated numerology. The second set of frequency resources with the second associated numerology is indicated by a second message for the another physical channel.

The determination module 1202 is configured to determine sets of frequency resources for the PDCCH and the another physical channel according to the first and second messages.

The detailed description about the first and second messages and specific implementation of the apparatus may refer to the method implementations described in combination with FIG. 10, which is not described herein again.

Terms "part", "module", "system" and the like used in the specification are adopted to represent an entity, hardware, firmware, combination of hardware and software, software or software in execution related to a computer. For example, a part may be, but not limited to, a process running on a processor, the processor, an object, an executable file, an execution thread, a program and/or a computer. It is graphically represented that all applications running on computing equipment and the computing equipment may be parts. One or more parts may reside in a process and/or an execution thread, and the parts may be located on a computer and/or distributed between two or more computers. In addition, these parts may be executed from various computer-readable media on which various data structures are stored. The parts may communicate through local and/or remote processes according to, for example, signals with one or more data groups (for example, data from two parts interacting with each other in a local system, a distributed system and/or a network, for example, the Internet interacting with another system through a signal).

Those skilled in the art may realize that the modules and algorithm operations of each example described in combination with the implementations disclosed in the disclosure may be implemented by electronic hardware or a combination of computer software and the electronic hardware. Whether these functions are executed in a hardware or software manner depends on specific applications and design constraints of the technical solutions. Those skilled in the art may realize the described functions for each specific application by different methods, but such realization shall fall within the scope of the disclosure.

Those skilled in the art may clearly learn about that the specific working processes of the system, device and module described above may refer to the corresponding processes in the method implementations for convenient and brief description and will not be elaborated herein.

In some implementations provided by the disclosure, it should be understood that the disclosed system, device and method may be implemented in another manner. The device implementation described above is only schematic, and for example, division of the modules is only logic function division, and other division manners may be adopted during practical implementation. For example, multiple modules or components may be combined or integrated into another system, or some characteristics may be neglected or not executed.

The modules described as separate parts may or may not be physically separated, and parts displayed as modules may or may not be physical modules, and namely may be located in the same place, or may also be distributed to multiple network modules. Part or all of the modules may be selected to achieve the purpose of the solutions of the implementations according to a practical requirement.

In addition, each function module in each implementation of the disclosure may be integrated into a processing unit, each module may also exist independently, and two or more than two modules may also be integrated into a module.

When being implemented in form of software function module and sold or used as an independent product, the function may also be stored in a computer-readable storage medium. Based on such an understanding, the technical solutions of the disclosure substantially or parts making contributions to a conventional art may be embodied in form of software product, and the computer software product is stored in a storage medium, including a plurality of instructions configured to enable a computer device (which may be a personal computer, a server, network equipment or the like) to execute all or part of the operations of the method in each implementation of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art shall fall within the scope of protection of the disclosure. Therefore, the scope of protection of the disclosure shall be subject to the scope of protection of the claims.

What is claimed is:

1. A method for configuring frequency resources, comprising:
    configuring, by a network device, a first message and a second message, wherein the first message indicates a first bandwidth part (BWP) with a first associated numerology for a Physical Downlink Control Channel (PDCCH), and wherein the second message indicates a second BWP with a second associated numerology for a Physical Downlink Sharing Channel (PDSCH); wherein the PDCCH contains scheduling information of the PDSCH, wherein a value of the first associated numerology is different from a value of the second associated numerology, and wherein each of the first and second associated numerologies is at least one of a Subcarrier Spacing (SCS) or a cyclic prefix (CP);
    transmitting, by the network device, the first message and the second message;
    transmitting, by the network device, the PDCCH in a resource from the first BWP; and
    transmitting, by the network device, the PDSCH in a resource from the second BWP.

2. The method according to claim 1, wherein at least one portion of the first BWP fails to overlap with the second BWP.

3. A method for receiving physical channels, comprising:
    receiving, by a User Equipment (UE), a Physical Downlink Control Channel (PDCCH), the PDCCH being transmitted in a resource from a first bandwidth part (BWP) with a first associated numerology, wherein the first BWP with the first associated numerology is indicated by a first message for the PDCCH; and
    receiving, by the UE, a Physical Downlink Sharing Channel (PDSCH), the PDSCH being transmitted in a resource from a second BWP with a second associated numerology, wherein the second BWP with the second associated numerology is indicated by a second message for the PDSCH,
    wherein the PDCCH contains scheduling information of the PDSCH, wherein a value of the first associated numerology is different from a value of the second associated numerology, and wherein each of the first and second associated numerologies is at least one of a Subcarrier Spacing (SCS) or a cyclic prefix (CP).

4. The method according to claim 3, wherein at least one portion of the first BWP fails to overlap with the second BWP.

5. An apparatus for configuring frequency resources comprising a processor and a memory storing program instructions, wherein when the program instructions are executed by the processor, the apparatus is configured to:
    configure a first message and a second message, wherein the first message indicates a first bandwidth part (BWP) with a first associated numerology for a Physical Downlink Control Channel (PDCCH), wherein the second message indicates a second BWP with a second associated numerology for a Physical Downlink Sharing Channel (PDSCH), wherein the PDCCH contains scheduling information of the PDSCH, wherein a value of the first associated numerology is different from a value of the second associated numerology, and wherein each of the first and second associated numerologies is at least one of a Subcarrier Spacing (SCS) or a cyclic prefix (CP); and
    output the first message and the second message, transmit the PDCCH in a resource from the first BWP, and transmit the PDSCH in a resource from the second BWP.

6. The apparatus according to claim 5, wherein at least one portion of the first BWP fails to overlap with the second BWP.

7. The apparatus according to claim 5, wherein the first message is one of System Information (SI), a Radio Resource Control (RRC) signaling, or a broadcasting signaling, and the second message is Downlink Control Information (DCI) transmitted in the PDCCH or a following PDCCH.

8. An apparatus for determining frequency resources comprising a processor and a memory storing program instructions, wherein when the program instructions are executed by the processor, the apparatus is configured to:
   obtain a Physical Downlink Control Channel (PDCCH), the PDCCH being transmitted in a resource from a first bandwidth part (BWP) with a first associated numerology, wherein the first BWP with the first associated numerology is indicated by a first message for the PDCCH;
   obtain a Physical Downlink Sharing Channel (PDSCH), the PDSCH being transmitted in a resource from a second BWP with a second associated numerology, wherein the second BWP with the second associated numerology is indicated by a second message for the PDSCH, wherein the PDCCH contains scheduling information of the PDSCH, wherein a value of the first associated numerology is different from a value of the second associated numerology, and each of the first and second associated numerologies is at least one of a Subcarrier Spacing (SCS) or a cyclic prefix (CP); and
   determine the first BWP for the PDCCH and the second BWP for the PDSCH according to the first and second messages.

9. The apparatus according to claim 8, wherein at least one portion of the first BWP fails to overlap with the second BWP.

10. The apparatus according to claim 8, wherein the first message is one of SI, a RRC signaling, and a broadcasting signaling and the second message is Downlink Control Information (DCI) transmitted in the PDCCH or a following PDCCH.

* * * * *